United States Patent [19]

LaVanture et al.

[11] 4,411,811

[45] Oct. 25, 1983

[54] CLARIFICATION OF BLACK PHOSPHORIC ACID WITH PHOSPHORIC ACID RINSE WATER

[75] Inventors: Mark D. LaVanture; George L. Walker, both of Richmond, Va.

[73] Assignee: Mobil Oil Corporation, New York, N.Y.

[21] Appl. No.: 421,593

[22] Filed: Sep. 22, 1982

Related U.S. Application Data

[60] Division of Ser. No. 288,611, Jul. 30, 1981, Pat. No. 4,377,561, which is a continuation-in-part of Ser. No. 177,037, Aug. 11, 1980, abandoned.

[51] Int. Cl.$^3$ .................. C01B 25/16; C05B 11/00
[52] U.S. Cl. .................... 252/182; 423/265; 423/321 R
[58] Field of Search ............ 252/182; 423/265, 321 R

[56] References Cited

U.S. PATENT DOCUMENTS

| | | | |
|---|---|---|---|
| 4,044,106 | 8/1977 | Fang | 423/312 |
| 4,110,422 | 8/1978 | Hill | 423/321 R |

FOREIGN PATENT DOCUMENTS

| | | | |
|---|---|---|---|
| 617322 | 3/1961 | Canada | 423/321 R |
| 1024924 | 4/1966 | United Kingdom | 423/321 R |

*Primary Examiner*—Irwin Gluck
*Attorney, Agent, or Firm*—Alexander J. McKillop; Michael G. Gilman; Edward F. Kenehan, Jr.

[57] ABSTRACT

This invention provides a process for clarifying black wet process phosphoric acid that comprises admixing said black phosphoric acid with phosphoric acid rinse water in a weight ratio of rinse water to black acid between about 0.5 and about 5, letting the resultant mixture stand thereby obtaining settled material and supernatant clarified black phosphoric acid, and, when said weight ratio is below about 1 to 1.5, depending on the quality of the black acid being clarified, separating said clarified black phosphoric acid from said settled material.

6 Claims, No Drawings

CLARIFICATION OF BLACK PHOSPHORIC ACID WITH PHOSPHORIC ACID RINSE WATER

CROSS REFERENCE TO RELATED APPLICATIONS

This is a division of application Ser. No. 288,611, filed July 30, 1981, now U.S. Pat. No. 4,377,561 which is a continuation-in-part of copending application Ser. No. 177,037, filed Aug. 11, 1980, abandoned.

BACKGROUND OF THE INVENTION

1. Field of the Invention

This invention is concerned with a process for clarifying black wet phosphoric acid.

2. Description of the Prior Act

Insofar as is now known the process of this invention has not been proposed.

SUMMARY OF THE INVENTION

This invention provides a process for clarifying black wet process phosphoric acid that comprises admixing said black phosphoric acid with phosphoric acid rinse water in a weight ratio of rinse water to black acid between about 0.5 and about 5, letting the resultant mixture stand thereby obtaining settled material and supernatant clarified black phosphoric acid, and, when said weight ratio is below about 1 to 1.5, depending on the quality of the black acid being clarified, separating said clarified black phosphoric acid from said settled material.

DESCRIPTION OF SPECIFIC EMBODIMENTS

As is well known in the art, black wet process phosphoric acid (black acid), obtained by treating phosphate rock with sulfuric acid, contains suspended and precipitated organic material and inorganic material. Much of this material will settle upon standing, leaving a black supernatant liquor. Accordingly, black acid is unsuitable for agricultural and industrial operations such as:

1. Manufacture of clear liquid fertilizer which is to be precision applied through small orifices without plugging.
2. Transportation and storage requirements which prohibit the settlement and caking of precipitates.
3. Waste treatment feed and other precisely metered operations involving transfer through close clearances which would be fouled by sludge.

Clarified black acid prepared in accordance with this invention can be used in such agricultural and industrial operations. The clarified black acid may contain very small amounts of settled solids and flocculent material, but they are negligible and of a particle size that they do not prohibit the use of the clarified black acid in the aforedescribed operations.

The black acid which is clarified by the process of this invention can be obtained by sulfuric acid treatment of phosphate rock. In general, the black acid contains approximately 50% $P_2O_5$.

In accordance with this invention, the black acid is admixed with phosphoric acid rinse water. This rinse water is a by-product from the aluminum polishing industry, which uses industrial grade phosphoric acid in aluminum bright dipping. After the aluminum piece has been dipped, it is rinsed with water and the water is collected. When the concentration of $H_3PO_4$ in the rinse water attains, in general, about 36% it is used, for example, in fertilizer manufacture.

In general, the dipping bath used in aluminum bright dipping can contain, by weight, about 50–75% $H_3PO_4$, about 2–5% $HNO_3$, about 0–3% $H_2SO_4$, and about 1–3% Al. About 95% of the aluminum polishing industry retains collected rinse water until it attains a concentration of $H_3PO_4$ of about 35–37 weight percent. Some operators, however, may stop collecting rinse water at a concentration of $H_3PO_4$ lower than 35–37%, while some others may exceed that concentration. Accordingly, the rinse water may contain generally, by weight, about 10–45% $P_2O_5$, about 0.5–3% $HNO_3$, and about 0.2–3% Al. Typically, phosphoric acid rinse water contains, by weight, about 25–27% $P_2O_5$ (35–37% $H_3PO_4$), about 70–72% $H_2O$, and about 2–3% impurities, including about 1% $HNO_3$ and about 1.5% Al. The weight ratio of rinse water to black acid can be between about 0.5 and about 5, preferably between about 1 and about 2.5. The mixture of rinse water and black acid is admixed and let stand so that any solid material present can settle, usually one to two days. Generally, when said weight ratio is below 1 to 1.5, the amount of settled solids will be moderate to heavy, leaving supernatant clarified black phosphoric acid. In this case, it is feasible to separate the clarified black acid, as by decantation, filtration, or other means of separating liquids from solids.

The black acid and rinse water are admixed and then permitted to stand to clarify. In general, mixing is effected with gentle or mild agitation. In many cases, the turbulence caused by adding the rinse water can provide sufficient agitation. As indicated hereinbefore, the black acid is clarified when the supernatant liquid is clear and light in color, although a slight haze can be tolerated. At ratios of rinse water to black acid above about 1 to 1.5, depending on the quality of the black acid used, there may be present a very small, negligible amount of settled solids and flocculant material. When the ratio is below about 1 to 1.5, there will be a moderate to heavy amount of settled solids with a clear supernatant liquid. In this case, the supernatant liquid can be separated and used in the manufacture of clear liquid fertilizers. The solid material can be used in the manufacture of suspension grade fertilizers.

The amount of rinse water used will depend somewhat on the nature of the particular black acid to be treated, i.e., whether it is a "clean" acid (relatively low impurity content) or a "dirty" acid (relatively high impurity content), as indicated hereinbefore.

In the following examples, two black acids were used. Acid A was a typical "clean" acid and Acid B was a "dirty" acid. Typical analyses of these acids, in weight percent, are as follows:

|  | Acid A | Acid B |
| --- | --- | --- |
| $P_2O_5$ | 53.6 | 50 |
| $H_3PO_4$ | 74 | 70 |
| $H_2SO_4$ | 2 | 5 |
| Other impurities | 2 | 5 |
| $H_2O$ | 22 | 20 |

The black acids used in the following examples, when agitated and let settle for 24 hours, showed a heavy sediment fall out and a cloudy liquid phase. The phosphoric acid rinse water contained by weight about 25%

$P_2O_5$, about 1% $HNO_3$, about 1.5% Al, and the balance water.

EXAMPLE 1

Rinse water (111 g.) and 222 g. Acid B were mixed and let stand for 24 hours. There was moderate-heavy sediment fall out and a clear liquid phase.

EXAMPLE 2

Rinse water (154 g.) and 154 g. Acid B were mixed and let stand for 24 hours. There was a moderate sediment fall out and a mostly clear liquid phase.

EXAMPLE 3

Rinse water (174 g.) and 87 g. Acid B were mixed and let stand for 24 hours. There were very few negligible solids fall out and a clear liquid phase.

EXAMPLE 4

One part by weight rinse water and two parts by weight Acid A were admixed and let stand about 24 hours. The liquid phase was clear and amber in color. There was a small amount of settled solids.

EXAMPLE 5

One part by weight rinse water and one part by weight Acid A were admixed and let stand about 24 hours. The liquid phase was clear and light green in color. There was a negligible amount of settled solids.

EXAMPLE 6

Two parts by weight rinse water and one part by weight Acid A were admixed and let stand about 24 hours. The liquid phase was clear and lighter green in color than in Example 5. There was a negligible amount of settled solids.

In Examples 1 through 3, a typical dirty acid was used. In these examples, the material of Examples 1 and 2 can be separated and the liquid phase used in the manufacture of clear liquid fertilizer. In Examples 4 through 6, a typical clean acid was used. In these examples, the material of Example 4 can be separated and the liquid phase used in the manufacture of liquid fertilizer. Thus, in the case of a clean acid separation of clarified black acid from settled material would be made when the ratio of rinse water to black acid is below about 1. In the case of a dirty acid, however, separation would be made when the ratio of rinse water to black is below about 1.5. In general, the ratio of rinse water to black acid below which separation would be made is about 1 to 1.5, depending upon the quality of the black acid being clarified, i.e., whether it is a clean acid or a dirty acid.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A clarified phosphoric acid composition comprising a mixture of black wet process phosphoric acid with phosphoric acid rinse water in a weight ratio of rinse water black phosphoric acid between about 0.5 and about 5, said phosphoric acid rinse water being the water collected from aluminum bright dipping water rinsing and containing, by weight, about 10–45% $P_2O_5$ and impurities including about 0.5–3% $HNO_3$ and about 0.2–3% Al.

2. The composition of claim 1, wherein said phosphoric acid rinse water contains, by weight, about 25–27% $P_2O_5$ and about 2–3% impurities including about 1% $HNO_3$ and about 1.5% Al.

3. The composition of claim 1, wherein said weight ratio is between about 1 and about 2.5.

4. The composition of claim 1, wherein said weight ratio is below about 1 to 1.5, and settled material is separated from said composition.

5. The composition of claim 1, wherein said weight ratio is above about 1 to 1.5 and said composition further comprises a negligible amount of settled material consisting of settled solids and flocculant material.

6. The composition of claim 1, wherein said black phosphoric acid contains approximately 50% $P_2O_5$ by weight.

* * * * *